United States Patent [19]

Stephens et al.

[11] Patent Number: 4,751,147

[45] Date of Patent: Jun. 14, 1988

[54] LOW VISCOSITY, SEMICRYSTALLINE CHLORINATED POLYETHYLENE RESINS AND ARTICLES FORMED THEREFROM

[75] Inventors: Keith E. Stephens; Andre J. Uzee, both of Baton Rouge, La.

[73] Assignee: The Dow Chemical Company, Midland, Mich.

[21] Appl. No.: 77,478

[22] Filed: Jul. 24, 1987

Related U.S. Application Data

[62] Division of Ser. No. 859,597, May 5, 1986.

[51] Int. Cl.$^4$ .............................................. B32B 27/32
[52] U.S. Cl. .................................. 428/523; 525/334.1
[58] Field of Search ...................... 428/523; 525/334.1

[56] References Cited

U.S. PATENT DOCUMENTS

| | | | |
|---|---|---|---|
| 2,268,162 | 12/1941 | Myles et al. | 260/94 |
| 2,586,363 | 2/1952 | McAlvey | 260/79.3 |
| 2,592,763 | 4/1952 | Taylor | 260/94.9 |
| 2,890,213 | 6/1959 | Noeske | 260/94.9 |
| 2,982,759 | 5/1961 | Heuse | 260/79.3 |
| 3,033,845 | 5/1962 | Scott | 260/94.9 |
| 3,035,038 | 5/1962 | Nolte et al. | 525/334.1 |
| 3,060,164 | 10/1962 | Canterino et al. | 525/334.1 |
| 3,227,781 | 1/1966 | Klug et al. | 260/897 |
| 3,296,222 | 1/1967 | Dixon et al. | 260/79.3 |
| 3,347,835 | 10/1967 | Lorenz | 525/333.9 |
| 3,399,091 | 8/1968 | Cornay et al. | 525/334.1 |
| 3,454,544 | 7/1969 | Young et al. | 260/88.2 |
| 3,470,147 | 9/1969 | Shorr et al. | 525/334.1 |
| 3,563,974 | 2/1971 | Eckardt et al. | 525/334.1 |
| 3,591,660 | 7/1971 | Graham et al. | 260/897 |
| 3,759,888 | 9/1973 | Nose et al. | 525/356 |
| 4,029,862 | 6/1977 | Liu et al. | 525/334.1 |
| 4,244,838 | 1/1981 | Gessell | 252/429 B |
| 4,246,383 | 1/1981 | Gessell | 526/92 |
| 4,425,206 | 1/1984 | Hutchinson | 204/159.18 |
| 4,487,891 | 12/1984 | Walton et al. | 525/222 |
| 4,591,621 | 5/1986 | Ennis | 525/344 |

FOREIGN PATENT DOCUMENTS 843209 of 0000 United Kingdom .
950374 1/1962 United Kingdom .

*Primary Examiner*—Joseph L. Schofer
*Assistant Examiner*—Bernard Lipman
*Attorney, Agent, or Firm*—D. R. Howard

[57] ABSTRACT

Chlorinated polyethylene resins which are semicrystalline yet of sufficiently low viscosity to be processible on conventional extrusion equipment are provided. The resins may be used in a variety of applications such as membranes, either thermoplastic or thermoset, wire and cable jackets and the like. Plasticizers and other viscosity-reducing aids need not be used in conjunction with these resins.

9 Claims, No Drawings

LOW VISCOSITY, SEMICRYSTALLINE CHLORINATED POLYETHYLENE RESINS AND ARTICLES FORMED THEREFROM

CROSS-REFERENCE TO RELATED APPLICATION

This is a division of application Ser. No. 859,597, filed May 5, 1986.

BACKGROUND OF THE INVENTION

The present invention concerns chlorinated polyethylene resins which are both semicrystalline and processible on conventional equipment without the need for plasticizers and other viscosity-reducing process aids. The present invention also concerns articles fabricated from compositions containing said resins, e.g., roofing membranes and wire and cable jackets.

Various processes for chlorinating olefin polymers in general and ethylene polymers in particular are known. The processes can generally be grouped into three types, namely solution chlorination, suspension chlorination and bulk chlorination. Chlorination of polyethylene in solution is known from U.S. Pat. No. 3,060,164. Chlorination in an aqueous suspension or an inert liquid is known from U.S. Pat. Nos. 2,592,763 and 3,454,544. Bulk chlorination, or chlorination in the absence of a liquid suspension agent or solvent, is described in U.S. Pat. Nos. 2,890,213 and 4,425,206 as well as in British Pat. No. 834,905.

Chlorinated polyethylene materials prepared by the three chlorination methods differ markedly in terms of physical properties, even if one starts with the same polyethylene resin and obtains the same overall chemically combined chlorine content. This appears to be due primarily to the more or less statistical distribution of chlorine in and along chlorinated polyethylene macromolecules. British Pat. Nos. 843,209 and 950,374 explain this phenomenon.

The term "lightly formulated", as used herein, refers to a compound containing 100 parts of chlorinated polyethylene resin, 3 parts of epoxidized soybean oil, 2 parts of calcium stearate and 0.5 parts of stearic acid.

The term "formulated low temperature brittleness value" refers to testing of ASTM D-746 type T-50 samples prepared from the physical blend detailed herein under the heading "Procedure for Preparing Roofing Membrane Test Samples".

SUMMARY OF THE INVENTION

One aspect of the present invention is a semicrystalline chlorinated polyethylene resin having a chemically combined chlorine content of from about 20 to about 33 percent by weight of polymer, a heat of fusion of from about 7.5 to about 16 calories per gram, a melt viscosity, measured with a capillary rheometer having a capillary size of 0.05 inches by 2 inches (0.13 by 5.08 centimeters) at a temperature of 190° Centigrade and a shear rate of 145 reciprocal seconds (hereinafter referred to simply as "melt viscosity"), of from about 5,000 to about 11,000 poise (500 to 1100 pascal seconds), a lightly stabilized tensile stress at 100% elongation as measured by ASTM D-412-75 (hereinafter "100 percent modulus") of from about 150 to about 750 pounds per square inch (1.0 to 5.2 megapascals) and a formulated low temperature brittleness rating lower than about −25° Centigrade, the polyethylene resin, prior to chlorination, having a viscosity of from about 2000 to about 9000 poise (200 to 900 pascal seconds).

A second aspect of the present invention is a polymer-based membrane fabricated from a composition comprising a chlorinated polyethylene resin having a chemically combined chlorine content of from about 20 to about 33 percent by weight of polymer, a heat of fusion of from about 7.5 to about 16 calories per gram, a melt viscosity of from about 5,000 to about 11,000 poise (500 to 1100 pascal seconds), a lightly stabilized 100 percent modulus of from about 150 to about 750 pounds per square inch (1.0 to 5.2 megapascals) and a formulated low temperature brittleness rating lower than about −25° Centigrade, the polyethylene, prior to chlorination, having a viscosity of from about 2000 to about 9000 poise (200 to 900 pascal seconds).

DESCRIPTION OF THE PREFERRED EMBODIMENTS

As used herein, the term "polyethylene" means essentially linear homopolymers of ethylene as well as essentially linear interpolymers of at least about 90 mole percent ethylene and up to about 10 mole percent of one or more ethylenically unsaturated monomers copolymerizable therewith. The monomers suitably contain from about 3 to about 18 carbon atoms and include, for example, propylene, butene-1, pentene-1, 3-methylbutene-1, 4-methylpentene-1, hexene-1, octene-1, dodecene-1, octadecene-1,1,7-octadiene and the like.

Polyethylene resins are suitably prepared under conditions characteristic of Ziegler polymerization in the presence of a transition metal-containing catalyst and at least one cocatalyst or activator. An illustrative catalyst is taught in U.S. Pat. No. 4,244,838. The use of that catalyst is taught in U.S. Pat. No. 4,246,383. Other catalysts and processes may be used provided the polyethylene resins produced therewith meet the criteria specified herein.

Polyethylene resins used herein meet two criteria. First, the resins have a density of from about 0.94 to about 0.97 grams per cubic centimeter. Second, the resins have a melt viscosity of from about 2000 to about 9000 poise (200 to 900 pascal seconds).

The polyethylene resins are beneficially chlorinated by the suspension or slurry process disclosed in U.S. Pat. No. 3,454,544, the teachings of which are incorporated herein by reference thereto.

In a typical slurry chlorination run, the polyethylene resins is first chlorinated up to a chlorine content of from about two to about ten percent while being heated from a temperature of about 90° to about 110° Centigrade over a suitable time interval, e.g., about ten minutes. The partially chlorinated resin is then further chlorinated by one of two alternative schedules. In one schedule, chlorination is continued while the slurry is heated to a line-out temperature over a short time interval, e.g., about twenty minutes. The line-out temperature is chosen to achieve a desired amount of residual crystallinity as reflected by heat of fusion. A typical line-out temperature is in the range of from about 115° to about 123° Centigrade. The term "line-out" is used herein to refer to a constant temperature or isotherm at which the slurry is maintained until chlorination is complete. In the second alternative, there is no line-out temperature. The slurry is simply heated at a constant rate, while continuing chlorination, until a final temperature and a desired chlorine content are reached. The final temperature and the line-out temperature are less than the crystalline melting point of the polyethylene starting material. As a general rule, the final temperature used in the second alternative must be higher than the line-out temperature of the first alternative in order to achieve the same level of crystallinity. The second alternative is used when a higher 100 percent modulus rating is desired. As a general rule, 100 percent modulus decreases as the amount of chlorine added at the line-out temperature increases and vise versa. The temperatures and times are readily determined without undue experimentation.

It has been found that the solution process usually provides noncrystalline chlorinated polyethylene resins when the chlorine content is from about 25 to about 29 percent by weight of polymer. The fluidized bed (bulk) process produces chlorinated polyethylene resins which, although suitable for purposes of the present invention, tend to be less stable and have higher 100% modulus values than resins having the same chlorine content but prepared by the suspension process. As such, the suspension chlorination process is preferred over either of the other processes.

The chlorinated polyethylene resins of the present invention have certain characteristic properties. The characteristic properties include chlorine content, heat of fusion, lightly formulated 100 percent modulus and formulated low temperature brittleness rating.

The chlorinated polyethylene resins of the present invention have a chemically combined chlorine content which is suitably from about 20 to about 33, beneficially from about 23 to about 30 and desirably from about 24 to about 26 percent by weight of polymer. It has been found that a formulated low temperature brittleness rating of less than about −25° Centigrade, e.g., −30° Centigrade, cannot be attained if the chemically combined chlorine content is less than about 21 percent or greater than about 33 percent, based on chlorinated polyethylene weight.

The chlorinated polyethylene resins have a heat of fusion, measured by differential scanning calorimetry, of from about 7.5 to about 16, desirably from about 8 to about 14, calories per gram. It has been found that as heat of fusion increases at a constant chlorine content, the formulated low temperature brittleness rating also degrades, e.g., it occurs at temperatures above −25° Centigrade. Accordingly, care must be taken to avoid an excessively high heat of fusion. A heat of fusion of less than about 7.5 calories per gram is also to be avoided because 100% modulus decreases as heat of fusion decreases.

The chlorinated polyethylene resins have a melt viscosity of from about 5,000 to about 11,000, desirably from about 5,500 to about 10,000, poise. In terms of pascal seconds, the viscosity is from about 500 to about 1100, desirably from about 550 to about 1000. At viscosities of less than about 500 pascal seconds, the formulated low temperature brittleness rating increases above −25° Centigrade. At viscosities of greater than about 1100 pascal seconds, the resin becomes very difficult to process on conventional extrusion or calendering equipment used in making roofing membranes and conventional extrusion equipment used in making cable jackets.

The chlorinated polyethylene resin has a lightly formulated 100 percent modulus of from about 150 to about 750 pounds per square inch (1.0 to 5.2 megapascals), desirably from about 350 to about 650 pounds per square inch (2.4 to about 4.5 megapascals).

The chlorinated polyethylene resins of the present invention may be used in preparing a variety of articles, e.g., polymer-based membranes, wire and cable jackets and the like. The membranes are beneficially thermoplastic, but may be thermoset if vulcanized, e.g., by radiation curing. The thermoplastic membranes have a membrane blocking value which is suitably less than 1.5 pounds per inch (26.8 kilograms per meter) and desirably less than or equal to 1.0 pound per inch (17.8 kilograms per meter).

The chlorinated polyethylene resins of the present invention may be compounded with other components such as fillers, pigments, stabilizers, process aids and the like. Amounts and types of "other components" will vary depending upon factors such as effect upon composition properties and cost.

Fillers which may be used in conjunction with the resins of the present invention are finely-divided, inorganic materials of natural or synthetic origin in the form of regular or irregular particles, platelets or fibrous pieces. Suitable materials include various types and grades of calcium carbonate (whiting), calcium sulfate, mica, talc, kaolin and other clay minerals, silicates, silica, barytes, magnesium oxide, magnesium carbonate, aluminum trihydrate and the like, and mixtures of such fillers. The fillers are suitably of a finess sufficient to pass through a 100-mesh screen sieve (U.S. Standard Sieve Series). The fillers beneficially have equivalent spherical diameters less than about 15 microns.

The fillers, whether used in preparing roofing membranes or wire and cable compounds, are suitably present in an amount of from about 10 to about 80 parts per hundred parts by weight of chlorinated polyethylene resin. The fillers are desirably present in an amount of from about 10 to about 50 parts per hundred parts by weight of chlorinated polyethylene resin.

Organic and mineral pigments which may be used in combination with the chlorinated polyethylene resin in roofing membrane compounds or wire and cable jacketing compounds include carbon black, titanium dioxide and the like as well as mixtures thereof. The pigments are suitably present in an amount of from about 2 to about 50 parts per hundred parts of chlorinated polyethylene resin. The amount of pigment is desirably from about 10 to about 40 parts per hundred parts of chlorinated polyethylene resin.

Stabilizers are normally used in conjunction with the chlorinated polyethylene resins of the present invention in order to protect said resins against possible decomposition by heat of processing and the like. Stabilizers conventionally used in preparation of vinyl polymer and copolymer sheet compositions are generally suitable. Examples include organic complexes, oxides and/or salts of lead, tin, barium, cadmium, magnesium, sodium, etc. Specific examples include dibasic lead phthalate, lead oxide, magnesium oxide, magnesium hydroxide, sodium phosphate, magnesium carbonate, barium-cadmium stearate and the like. Small quantities of such stabilizers are generally effective. Two to twenty parts of stabilizer per hundred parts of chlorinated polyethylene resin are generally suitable.

Compounds including the chlorinated polyethylene resins of the present invention are suitably mixed by a heated two roll mill, a Banbury type mixer, a compounding extruder or equivalent mixing and compounding equipment.

The semicrystalline chlorinated polyethylene resins of the present invention, when used as part of a wire and cable jacketing compound, are suitably blended with a conventional semicrystalline chlorinated polyethylene resin such as that commercially available from The Dow Chemical Company under the trade designation Tyrin ® 2552. Satisfactory results, in terms of physical property retention with improved processability, are obtained when the chlorinated polyethylene resins of the present invention are present in an amount of from about zero to about 50 percent by weight of all chlorinated polyethylene in the compound. The amount is beneficially from about zero to about 40, and desirably from about five to about 30, percent by weight of total chlorinated polyethylene content. The amount will vary with the properties of the chlorinated polyethylene resin of the present invention and the properties desired of the compound. It is, however, readily discernible without undue experimentation.

Commercially and practically viable wire and cable jacketing compounds have an elongation greater than about 350 percent, a 100% modulus greater than about 1000 pounds per square inch (psi) (6.9 megapascals (mpa)), an ultimate tensile strength greater than about 1300 psi (9.0 mpa) and a low temperature brittleness rating of less than about −25° Centigrade.

The following examples are solely for purposes of illustration and are not to be construed as limiting the scope of the present invention. All parts and percentages are on a weight basis unless otherwise stated. All water used herein is deionized unless otherwise stated. Examples of the present invention are identified numerically whereas comparative examples are identified alphabetically.

GENERAL CHLORINATION PROCEDURE

An aqueous slurry comprising about twenty pounds (9.07 kilograms) of polyethylene resin, 25 milliliters of a surfactant commercially available from Thomson Hayward under the trade designation T-det N 9.5, 100 grams of talc, commercially available from Cyprus Industrial Minerals Company under the trade designation Mistron Vapor ® and 189 pounds (85.73 kilograms) of water was charged into a reactor and heated to a temperature of 100° Centigrade. After venting the reactor to remove oxygen, the slurry was cooled to a temperature of about 95° Centigrade before starting addition of gaseous chlorine. In stage one, chlorine was added to the reactor at a rate of 0.268 pounds per minute (0.12 kilograms per minute), while the slurry was heated at a constant rate over a period of about 13 minutes to a temperature of about 110° Centigrade. The chemically combined chlorine content at the end of the first stage was calculated to be about eight percent. In stage two, the slurry was heated at a constant rate over a period of about 23 minutes to a line-out temperature of from about 115° to about 123° Centigrade while gaseous chlorine was added at a rate of 0.214 pounds per minute (0.097 kilograms per minute). At a temperature of about 115° Centigrade, an additional 100 grams of talc and two liters of water were added to the slurry. The chemically combined chlorine content at the end of the second stage was about 17 percent. Chlorination was continued at the line-out temperature and the same flow rate of gaseous chlorine until a desired chemically combined chlorine content and heat of fusion were obtained. By way of example, a chlorine content of about 25 percent was obtained by chlorination at the line-out temperature for a period of about 23 minutes. The chlorinated resin was then cooled, washed with water and dried for further testing and compounding.

Table I contains a listing of the polyethylene resins chlorinated by the foregoing procedure. Resin A was a powder prepared by a slurry process. It was not commercially available. Resins B through E were prepared by a solution process and commercially available in pellet form from The Dow Chemical Company under the trade designations listed in Table I. Accordingly, Resins B through E were ground using the Thermofine Size Reduction System (standard SE-12-C mill) commercially available from Wedco to a particle size of about 13 mils (0.33 millimiter) prior to chlorination.

TABLE I

| | POLYETHYLENE FEEDSTOCKS | | | | |
|---|---|---|---|---|---|
| Resin Identification | Melt Index (g/10 min) | Viscosity (poise) | Heat of Fusion (cal/g) | Weight Average Molecular Weight | Trade Designation |
| A | 8.58 | 3441 | 47.16 | 86,000 | Not applicable |
| B | 4.0 | 8535 | 34.36 | 86,000 | PE/HD 04052N |
| C | 12.0 | 3875 | 34.08 | 62,000 | PE/HD 12050N |
| D | 17.0 | 2893 | 33.37 | 54,000 | PE/HD 17050N |
| E | 30.0 | 2031 | 38.05 | 57,000 | PE/HD 30060M |

PROCEDURE FOR PREPARING ROOFING MEMBRANE TEST SAMPLES

A physical blend was prepared from the following components:

a. 100 parts of a chlorinated polyethylene resin prepared as hereinabove specified;

b. 2.5 parts of a barium-cadmium-zinc stabilizer commercially available from Argus Chemical under the trade designation Mark ® 7119;

c. 1.5 parts of an oxidized polyethylene wax commercially available from Allied Chemical Corporation under the trade designation 629A wax;

d. 0.8 parts of stearic acid;

e. 10 parts of talc commercially available from Cyprus Industrial Minerals Company under the trade designation Mistron Vapors ®;

f. 0.7 parts pf a pentaerythritol diphosphite antioxidant commercially available from Borg-Warner Chemical Company under the trade designation Ultranox ® 626;

g. 0.5 parts of dilauryl thiodipropionate, a thioester antioxidant commercially available from Carstab Corporation under the trade designation DLTDP;

h. 0.5 parts of an alkylated phenol antioxidant commercially available from Ciba-Geigy Corporation under the trade designation Irganox ® 1076; and i. 25 parts of titanium dioxide commercially available from E. I. du Pont de Nemours & Company under the trade designation TiPure ® R-960.

The physical blend was converted to a fused mixture using a two roll plastic compounding mill. The two roll mill had a set roll temperature of 320° Fahrenheit (160° Centigrade). The fused mixture was then further processed on the same two roll mill at the same set temperature for an additional five minutes. The further processed mixture was removed from the two roll mill in the form of a smooth heat plastified sheet. The sheet had a thickness of 80–90 mils (0.20–0.23 centimeters).

Pieces of the sheet were compression molded to form samples having a thickness of 0.065 inches (0.165 centimeters). Compression molding was accomplished in the following sequential manner using a hydraulic press:

a. heating at a temperature of 350° Fahrenheit (177° Centigrade) and at a force of 100 pounds per square inch (70,307 kilograms per square meter) for a period of three minutes;

b. heating at the same temperature, but at a force of 333 pounds per square inch (234,122 kilograms per square meter), for a period of three minutes;

c. cooling by circulating ambient water (about 70° Fahrenheit or about 21° Centigrade) through the press while maintaining the force at 333 pounds per square inch (234,122 kilograms per square meter) for a period of three minutes. Test specimens were cut from the samples so prepared for testing as hereinafter set forth.

PROCEDURE FOR PREPARING WIRE AND CABLE FORMULATION TEST SAMPLES

A physical blend was prepared from the following components:

a. An amount (see Table IV) of a chlorinated polyethylene resin having a chemically combined chlorine content of 25 percent, a nominal melt viscosity of 12,500 poise and a nominal heat of fusion of 11 calories per gram and being commercially available from The Dow Chemical Company under the trade designation Tyrin ® 2552;

b. an amount (see Table IV) of one of the chlorinated polyethylene resins (see, Table II) prepared as specified herein;

c. 6 parts of a lead phthalate stabilizer commercially available from Associated Lead Company under the trade designation Dythal ® XL;

d. 0.8 parts of stearic acid;

e. 2 parts of the oxidized polyethylene wax used in preparing roofing membrane test samples;

f. 0.5 parts of a polymerized 1,2-dihydro-2,2,4-trimethylquinoline antioxidant commercially available from R. T. Vanderbilt Company Incorporated under the trade designation Agerite ® Resin D powder;

g. 20 parts of carbon black commercially available from Cabot Corporation under the trade designation N-330;

h. 25 parts of the talc used in preparing roofing membrane test samples;

i. 6 parts of a chlorinated polyethylene compound containing 85% antimony oxide commercially available from Wyrough & Loser under the trade designation HA-85;

j. 14.7 parts of a chlorinated polyethylene compound containing 80 percent decabromodiphenyloxide, commercially available from Wyrough & Loser under the trade designation HE-25; and k. 25 parts of a high density polyethylene resin (see, Resin E, Table I).

An "upside-down" mixing technique was used to compound the listed components in a BR-size Banbury mixer. The term "upside-down" means that the resinous components (a) and (b) were added to the mixer last rather than first.

The components were mixed adiabatically and converted to a fused mixture according to the following schedule: (a) three minutes at 77 revolutions per minute (8 radians per second); (b) three minutes at 116 revolutions per minute (12 radians per second); and (c) three minutes at 155 revolutions per minute (16 radians per second). The fused mixture was removed from the mixer when the mixture reached a temperature of about 300° Fahrenheit (149° Centigrade).

The fused mixture was further processed for a period of three minutes using a two roll plastic compounding mill. The two roll mill had a set roll temperature of 325° Fahrenheit (163° Centigrade). The further processed fused mixture was removed from the two roll mill in the form of a smooth heat plastified sheet. The sheet had a thickness of about 200 mils (5.1 millimeters).

A 600 gram quantity of the sheet was returned to the two roll mill and further mixed for a period of 5 minutes. The two roll mill had a set roll temperature of 325° Fahrenheit (163° Centigrade). The further mixed sheet was removed from the two roll mill in the form of a smooth heat plastified sheet. The sheet had a thickness of about 90 mils (2.3 millimeters).

Pieces of the 90 mil (2.3 millimeter) sheet were compression molded to form samples having a thickness of about 75 mils (1.9 millimeters). Compression molding was accomplished in the following sequential manner using a hydraulic press: (a) heating at a temperature of 350° Fahrenheit (177° Centigrade) and at a force of 0 pounds per square inch for a period of 3 minutes; (b) heating at the same temperature but at a force of 500 pounds per square inch (351,535 kilograms per square meter) for a period of 3 minutes; and (c) cooling by circulating ambient water (about 70° Fahrenheit or 21° Centigrade) through the press while maintaining the force at 351,535 kilograms per square meter for a period of 3 minutes. Test bar specimens were cut from the samples so prepared for testing as hereinafter set forth.

TEST METHODS

MEMBRANE BLOCKING TEST

Two test bar specimens (strips) measuring two inches by six inches (5.1 centimeters by 15.2 centimeters) are used for this test. The strips are laid flat on a suitable support, such as a board, in a forced air convection oven with one strip being superimposed on the other strip. At one end of the paired strips, a separator sheet, e.g., a polyethylene film, is placed between the two strips so they are not in intimate contact for about two inches of their length. A metal block measuring two inches (5.1 centimeters) on a side and weighing four pounds (1.8 kilograms) is placed on top of the paired strips at the end opposite the separator sheet so that it covers an area of two inches by two inches (5.1 centimeters by 5.1 centimeters). The oven has a set temperature of 200° Fahrenheit (93.3° Centigrade). With the block and separator strip in place the strips are left in the oven for a period of 1 hour at the set temperature.

After the one hour period, the block is removed from the strips and the strips are removed from the oven. The strips are then transferred to a cooling chamber wherein ASTM standard conditions are maintained. ASTM standard conditions are 23±2° Centigrade and 50±5% humidity. The strips are left in the cooling chamber for a period of 24 hours.

After being cooled, the strips are removed from the cooling chamber. The ends of the strips separated by the separator sheet are placed in the jaws of a tensile testing machine (180° peel) and pulled apart at a rate of five inches per minute (two centimeters per minute). The force in pounds required to peel the strips apart is divided by the width of the strip in inches to provide a "Membrane Blocking Value".

STANDARD TESTS FOR MEMBRANE FORMULATIONS

A. Low Temperature Brittleness—ASTM Test D-746 using type T-50 specimens.

B. Ultimate Tensile Strength—ASTM Test D-412-80, Method A using two inch by one inch (5.1 by 2.5 centimeter) strips. The strips were placed in an Instron tensile testing apparatus with a 0.5 inch (1.3 centimeter) gap and pulled apart at a crosshead speed of 20 inches (50.8 centimeters) per minute.

C. Hardness, Shore A—ASTM D-2240

D. 100% Modulus—ASTM D-412-80, Method A

E. Tear (Type C)—ASTM D-624

F. Melt Viscosity—Measured with a capillary rheometer having a capillary size of 0.05 by 2 inches (0.13 by 5.08 centimeters) at a temperature of 190° Centigrade and a shear rate of 145 reciprocal seconds.

G. Heat of Fusion—Determined by differential scanning calorimetry over a temperature range of either 360°–420° Kelvin or 320°–420° Kelvin [Example 6 (Table II) only] at a rate of heating of 10° Kelvin per minute.

STANDARD TESTS FOR WIRE AND CABLE FORMULATIONS

Test bar specimens prepared as hereinabove specified are tested by the following American Society for Testing and Materials (ASTM) test methods:

a. 100 Percent Modulus—ASTM D-412-80;
b. Ultimate Tensile—ASTM D-412-80;
c. Elongation—ASTM D-412-80; and
d. Melt Viscosity—Measured with a capillary rheometer having a capillary size of 0.05 by 2 inches (0.13 by 5.08 centimeters) at a temperature of 190° Centigrade and a shear rate of 145 reciprocal seconds.

EXAMPLES 1–10 AND COMPARATIVE EXAMPLES A-I—

PREPARATION OF CHLORINATED POLYETHYLENE RESINS

The chlorination procedure detailed herein was used, except for Example 3, to prepare a number of chlorinated polyethylene resins. In Example 3, the rate of gaseous chlorine addition was one-half the rate for the other examples and comparative examples. Table II identifies the polyethylene starting materials and lists selected physical properties of the chlorinated resins.

TABLE II

CHLORINATED POLYETHYLENE PHYSICAL PROPERTY DATA

| Example/ Comparative Example | Polyethylene Resin | Percent Chlorine | Heat of Fusion (cal/g) | Viscosity (poise) | Formulated Low Temperature Brittleness (°C.) | Lightly Formulated 100% Modulus psi/mpa | |
|---|---|---|---|---|---|---|---|
| | | | | | | 25° C. | 80° C. |
| 1 | A | 29.1 | 9.0 | 6880 | −34 | 303/2.1 | 86/5.9 |
| A | A | 25.1 | 0.1 | 4276 | −36 | 317/2.2 | 30/2.1 |
| B | A | 26.5 | 22.6 | 6452 | −10 | 1221/8.4 | 398/2.7 |
| 2 | A | 21.6 | 12.2 | 5225 | −27 | 731/5.0 | 185/1.3 |
| 3 | A | 25.1 | 12.8 | 5878 | −30 | 498/3.4 | 167/1.1 |
| 4 | A | 25.0 | 11.8 | 5884 | −32 | 473/3.3 | 112/7.7 |
| 5 | E | 24.1 | 15.1 | 6191 | −42 | 731/5.0 | 217/1.5 |
| C | B | 24.7 | 6.8 | 13,400 | −51 | 468/3.2 | 117/8.1 |
| D | A | 34.6 | 7.2 | 9133 | −17 | 260/1.8 | 82/5.6 |
| E | A | 24.6 | 25.5 | 7398 | +1 | 1305/9.0 | 393/2.7 |
| 6 | A | 20.3 | 8.3 | 4606 | −33 | 738/5.1 | 156/1.1 |
| F | B | 24.1 | 9.3 | 16,060 | −52 | 512/3.5 | 173/1.2 |
| G | A | 29.9 | 18.2 | 9380 | — | 984/6.8 | 384/2.6 |
| 7 | C | 23.8 | 9.4 | 9627 | −42 | 470/3.2 | 142/9.8 |
| 8 | A | 23.6 | 9.1 | 5249 | −37 | 384/2.6 | 88/6.1 |
| 9 | D | 23.8 | 8.6 | 7880 | −40 | 424/2.9 | 119/8.2 |
| 10 | E | 24.3 | 12.9 | 5105 | −32 | 596/4.1 | 179/1.2 |
| 11 | A | 25.7 | 11.2 | 6881 | −29 | 474/3.3 | — |
| H | A | 24.9 | 17.1 | 5627 | — | 1111/7.7 | — |

"—" means not measured.

Certain of the chlorinated polyethylene resins listed in Table II were fabricated into roofing membrane samples using the procedure detailed herein. Results of physical property testing of the samples are presented in Table III.

TABLE III

PHYSICAL PROPERTY DATA FOR ROOFING FORMULATIONS

| Resin Example/ Comparative Example | 100% Modulus at 25° C.(psi/mpa) | Hardness Shore A | Tear Type "C" (lb/in/kg/m) | Sheet Blocking (lb/in/kg/m) | Low Temperature Brittleness (°C.) |
|---|---|---|---|---|---|
| 1 | 430/3.0 | 75 | 193/3447 | 0.8/14.3 | −34 |
| 2 | 912/6.3 | 86 | 286/5107 | 0.4/7.1 | −35 |
| 3 | 673/4.6 | 83 | 258/4607 | 1.4/25.0 | −30 |
| 4 | 570/3.9 | 85 | 228/4072 | 1.2/21.4 | −32 |
| 5 | 860/5.9 | 89 | 274/4893 | 1.0/17.8 | −42 |
| 6 | 883/6.1 | 86 | 301/5375 | 1.0/17.8 | −33 |
| A | 440/3.0 | 77 | 154/2750 | 7.0/125.0 | −36 |
| B | 1500/10.3 | 89 | 416/7429 | 0/0 | −10 |
| C | 598/4.1 | 77 | 237/4232 | 1.5/26.8 | −51 |

TABLE III-continued

PHYSICAL PROPERTY DATA FOR ROOFING FORMULATIONS

| Resin Example/ Comparative Example | 100% Modulus at 25° C.(psi/mpa) | Hardness Shore A | Tear Type "C" (lb/in/kg/m) | Sheet Blocking (lb/in/kg/m) | Low Temperature Brittleness (°C.) |
|---|---|---|---|---|---|
| D | 354/2.4 | 72 | 167/2982 | 1.5/26.8 | −17 |
| E | 1488/10.2 | 88 | 385/6875 | 0/0 | +1 |
| F | 668/4.6 | 88 | 231/4125 | 1.8/32.1 | −52 |

A review of the data presented in Tables II and III amply demonstrates the suitability of the chlorinated polyethylene resins of the present invention and distinguishes them from the resins of comparative examples A–F. The resins of comparative examples A–F are unsatisfactory for a variety of reasons. Comparative examples B, D and E have Low Temperature Brittleness Ratings which are above −25° Centigrade. Comparative examples C and F have viscosities too high for fabrication into roofing membranes using conventional equipment. Comparative example A is not a semicrystalline resin. Comparative example A also has an excessively high blocking value. Similar satisfactory results are obtained with other chlorinated polyethylene resins which are representative of the present invention.

PHYSICAL PROPERTY EVALUATION OF WIRE AND CABLE BLENDS

A number of wire and cable formulation blends were prepared, fabricated into test bar samples and evaluated for physical properties as specified hereinabove. Results of the testing are presented in Table IV. The resin identified as "T" is Tyrin ® 2552.

The data presented in Table IV clearly illustrate the beneficial effect of blending one of the chlorinated polyethylene resins of the present invention with a conventional semicrystalline chlorinated polyethylene resin. The data shows improved processability, in terms of lower viscosity, without appreciable degradation of desirable physical properties. Similar benefits are attained with other chlorinated polyethylene resins within the scope of the present invention.

TABLE IV

PHYSICAL PROPERTY DATA FOR WIRE & CABLE BLEND

| Chlorinated Polyethylene Resin Amounts by Resin Type* | | | | Ultimate tensile (psi/mpa) | Percent Elongation | Viscosity (poise) | 100% Modulus (psi/mpa) |
|---|---|---|---|---|---|---|---|
| T | 1 | 2 | 4 | | | | |
| 100 | 0 | 0 | 0 | 1423/9.8 | 388 | 14,900 | 1111/7.7 |
| 75 | 25 | 0 | 0 | 1374/9.5 | 473 | 13,190 | 1068/7.4 |
| 75 | 0 | 25 | 0 | 1426/9.8 | 444 | 12,440 | 1157/8.0 |
| 75 | 0 | 0 | 25 | 1312/9.0 | 465 | 12,260 | 1074/7.4 |
| 50 | 0 | 0 | 50 | 1227/8.5 | 443 | 10,080 | 1057/7.3 |
| 25 | 0 | 0 | 75 | 1112/7.7 | 422 | 9,305 | 1037/7.1 |

*See Table II

We claim:

1. A polymer-based membrane fabricated from a compound comprising a semicrystalline chlorinated polyethylene resin having a chemically combined chlorine content of from about 20 to about 33 percent by weight of polymer, a heat of fusion of from about 7.5 to about 16 calories per gram, a melt viscosity, measured with a capillary rheometer at a temperature of 190° Centigrade and a shear rate of 145 reciprocal seconds, of from about 5,000 to about 11,000 poise (5 to 11 pascal seconds), a lightly stabilized 100 percent modulus of from about 150 to about 750 pounds per square inch and a formulated low temperature brittleness rating of less than about −25° Centigrade, the polyethylene resin, prior to chlorination, having a viscosity of from about 200 to about 9000 poise (2 to 9 pascal seconds).

2. The membrane of claim 1 wherein the chlorinated resin has a chemically combined chlorine content of from about 23 to about 30 percent by weight of polymer.

3. The membrane of claim 1 wherein the chlorinated resin has a chemically combined chlorine content of from about 24 to about 26 percent by weight of polymer.

4. The membrane of claim 1 wherein the chlorinated resin has a heat of fusion of from about 8 to about 14 calories per gram.

5. The membrane of claim 1 wherein the chlorinated resin has a viscosity of from about 5.5 to about 10 pascal seconds.

6. The membrane of claim 1 wherein the chlorinated resin has a low temperature brittleness rating of less than about −30° Centigrade.

7. The membrane of claim 1 wherein the chlorinated resin has a lightly stabilized 100 percent modulus of from about 350 to about 650 pounds per square inch.

8. The membrane of claim 1 having a membrane blocking value of less than 1.5 pounds per inch.

9. The membrane of claim 1 having a membrane blocking value of less than or equal to 1.0 pound per inch.

* * * * *

UNITED STATES PATENT AND TRADEMARK OFFICE
CERTIFICATE OF CORRECTION

PATENT NO. : 4,751,147

DATED : June 14, 1988

INVENTOR(S) : Keith E. Stephens and Andre J. Uzee

It is certified that error appears in the above-identified patent and that said Letters Patent is hereby corrected as shown below:

Column 4, line 26 please delete "finess" and insert -- fineness --.

Column 6, line 43 please delete "Vapors" and insert -- Vapor --.

Column 12, line 36 please delete "200" and insert -- 2000 --.

Signed and Sealed this

Twentieth Day of December, 1988

Attest:

DONALD J. QUIGG

*Attesting Officer*     *Commissioner of Patents and Trademarks*